United States Patent Office 3,228,957
Patented Jan. 11, 1966

3,228,957
PYRROLIDINE PRODUCTION
Maximilian I. Fremery, Oakland, Calif., assignor to Shell Oil Company, New York, N.Y., a corporation of Delaware
No Drawing. Filed Dec. 16, 1963, Ser. No. 330,578
12 Claims. (Cl. 260—313)

This invention relates to a novel method for the production of certain heterocyclic compounds. More particularly, it relates to a novel method for the production of pyrrolidines and certain novel compounds obtained thereby.

Numerous methods are available for the production of pyrrolidines. Among these are the cyclization of $\alpha,\delta$-aminoalcohols, reduction of nitroketones with subsequent cyclization, reaction of tetrahydrofurans with ammonia or primary amines, and reduction of pyrroles or succinimides. Such methods, although capable of producing pyrrolidine or a number of substituted pyrrolidines, all suffer from the disadvantage of either requiring a series of synthetic operations or the utilization of difficultly obtained and/or economically expensive materials as reactants in the process, or both. It would be of considerable advantage to provide a method whereby pyrrolidines could be easily and economically produced.

It is the object of this invention to provide a novel process for the production of certain heterocyclic compounds. More particularly, it is an object to provide a novel process for the production of pyrrolidine and hydrocarbon derivatives thereof. An additional object is to provide a class of novel di- to trialkylpyrrolidines having particular utility.

It has now been found that these objects are accomplished by reacting hydrocarbon aziridines with hydrocarbon olefins at elevated temperature. Under the reaction conditions of the process of the invention, pyrrolidines are produced easily and efficiently and in comparably high yield by a one-step process.

The aziridine reactants of the process of the invention, which are also referred to as enimines, contain a three-member heterocyclic ring comprising one atom of nitrogen and two atoms of carbon. Suitable aziridine reactants are hydrocarbon aziridines, that is, contain only atoms of carbon and hydrogen besides the nitrogen moiety of the three-membered heterocyclic ring. Illustrative compounds of this type contain from 2 to 60 carbon atoms, preferably 2 to 30 carbon atoms, and are represented by the formula

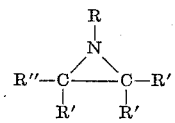

wherein R, R' and R" independently are hydrogen, alkyl, having up to 30 carbon atoms, preferably up to 20, aralkyl, having up to 30 carbon atoms, preferably up to 20, or aryl, preferably mononuclear aryl, having 6 to 10 carbon atoms.

Illustrative of such compounds are ethylenimine, 1-methylaziridine, 1,2 - dimethylaziridine, 1,2,3 - triethylaziridine, 1-dodecylaziridine, 2-tetradecylaziridine, 2-butylaziridine, 2,3-dihexylaziridine, 2,2 - dimethylaziridine 1-phenylaziridine, 1-octadecylaziridine, 2-(3-phenylpropyl)-3-methylazridine, 2-eicosylaziridine, 2,2,3-trimethylaziridine, 1-benzylaziridine, 2-(p-tolyl)aziridine, 1-pentadecylaziridine, 2,2,3,3-tetramethylaziridine, 1-amylaziridine and the like.

Preferred aziridines of the above-depicted formula are wholly aliphatic, that is, contain no aromatic substituents. Further preferred are those aziridines of the above-depicted formula wherein all R' groups are hydrogen, i.e., a 1,2-non- to dialkylaziridine, particularly wherein any 2-alkyl substituents are methyl. Optimum utilization of the process of the invention is obtained through utilization of those compounds wherein R" is also hydrogen. Such aziridines comprise ethylenimine and N-alkyl derivatives thereof; particularly preferred is N-methylethylenimine, i.e., 1-methylaziridine.

In the process of the invention, the aziridine is reacted with a hydrocarbon olefin. By the term olefin as employed herein is meant an organic compound having only atoms of carbon and hydrogen and containing one or more ethylenic linkages, i.e., carbon-carbon double bonds, which are not conjugated with other unsaturation. Olefins that are suitably employed in the process of the invention have from 1 to 2 ethylenic linkages as the only unsaturation present in the molecule, which linkages are independently terminal or internal ethylenic linkages, and the olefin contains from 2 to 30 carbon atoms, preferably from 2 to 20.

Illustrative of such suitable olefins are acyclic mono-olefins such as ethylene, propylene, 1-butene, 2-butene, isobutylene, 1-hexene, 2-hexene, 2,2,7-trimethyl-4-nonene, allylbenzene, 1-octene, 3-octene, 1-dodecene, 1-tetradecene, 1-docosene, 2-hexacosene, 1-triacontene and 1-eicosene; cyclic mono-olefins such as cyclopentene, cyclohexene, 3,4,6-triethylcyclododecene and cyclooctene; acyclic di-olefins such as biallyl, 1,7-octadiene, 2,6-nonadiene, 1,8-decadiene, 3,4-dimethyl-1,5-hexadiene, 1,13-tetradecadiene and 1,17-octadecadiene; and cyclic di-olefins such as 1,4-cyclohexadiene, 1,5-cyclooctadiene, dipentene and 1,6-cyclododecadiene. Preferred olefins are acyclic mono-olefins, particularly acyclic straight-chain mono-olefins. Largely because of the desirable properties of the products produced therefrom, a preferred class of acyclic straight-chain mono-olefins are those olefins containing from 10 to 20 carbon atoms, especcially 12–16. In general, regardless of the number of carbon atoms present, terminal olefins are preferred over the corresponding internal olefin.

Without wishing to be bound by any specific theory, it appears that the process of the invention involves thermal cleavage of a carbon-nitrogen bond of the aziridine ring to form a 1,3-diradical and subsequent 1,3-cycloaddition of the diradical to the ethylenic linkage of the olefin to form the observed five-membered pyrrolidine ring. In view of the highly reactive character of the free radicals as well as olefins under the elevated temperature of the reaction, it is surprising that high selectivity towards the 1,3-cycloaddition process is observed.

The efficiency of the pyrrolidine production is favored by an excess of olefin whereby the likelihood of olefin trapping of the diradical species formed by aziridine ring cleavage is increased. The olefin reactant is therefore employed in molar excess over the aziridine reactant. From practical considerations, however, utilization of too great an excess of olefin renders process operation and product recovery more difficult due to the large bulk of the reaction mixture. Molar ratios of olefin to aziridine from about 2:1 to about 100:1 are generally satisfactory, while molar ratios from about 4:1 to about 20:1 are preferred.

The reaction process may be conducted in the absence of solvent or in the presence of a solvent, e.g., a hydrocarbon which is inert under the conditions of the reaction. Although the presence of minor amounts of solvent or other inert impurity is not overly detrimental to the process of the invention, large amounts of solvent serve to unnecessarily dilute the reaction mixture and render less likely the probability of the desired reaction taking place. It is therefore preferred to conduct the reaction in the substantial absence of solvent.

The process of the invention is conducted at temperatures above that which is required for aziridine ring cleavage, but below temperatures at which extensive polymerization or decomposition of the reacting species is observed. Suitable temperatures vary from about 250° C. to about 450° C., although temperatures from about 300° C. to about 400° C. are preferred.

The process of the invention may be conducted in a batchwise or in a continuous manner. A typical batchwise procedure comprises charging the olefin to an autoclave or similar reactor and adding the aziridine, preferably in increments, to the olefin maintained at reaction temperature. Typical addition times vary from about 0.25 hours to about 2 hours, although shorter addition times may be utilized and longer addition times actually increases the efficiency of the reaction by providing a greater excess of olefin over the aziridine present at any given time. Subsequent to aziridine addition, the reaction mixture is maintained at reaction temperature to insure complete reaction, typically a period of time from 1 to 4 times as long as the time employed for aziridine addition. Best results are obtained when a small amount of base, e.g., alkali metal hydroxide, is present in the reaction vessel to retard ionic polymerization of olefin catalyzed by acidic impurities, and the reactor is also customarily flushed with nitrogen or other inert gas prior to the reaction to exclude carbon dioxide or other acidic components of the air. Such precautions, although generally desirable, are not necessary if the nature of the reactants and reaction environment is such that no acidic impurities are present.

When the reaction is conducted in an autoclave or similar reactor, it is preferred to employ superatmospheric pressure to maintain the reactants in the liquid phase. Advantageous use is made of the pressures generated by the reactants when heated to reaction temperature in the sealed reaction vessel, which pressures are typically from about 100 p.s.i. to about 1000 p.s.i., although higher or lower pressures may be employed. Subsequent to reaction, the product mixture is removed and separated by conventional methods such as fractional distillation, selective extraction and the like, and the excess olefin is suitable for recycling for further reaction.

The liquid-phase process is particularly suitable for the reaction of olefins having 4 carbons or more. Although such a process could be utilized for the reaction of the lower olefins, some risk is attendant to maintaining the lower olefins, particularly ethylene, at high pressure and temperature due to the known tendency for spontaneous decomposition, and alternate reaction procedures are preferred for such lower olefins.

A typical continuous-type procedure comprises conducting the reaction in the vapor phase, as by passing a gaseous mixture of the olefin and the aziridine through a heated tube maintained at the desired reaction temperature. The reactants may be mixed prior to or simultaneously with introduction into the tubular reactor, although in the case of olefins normally liquid at ambient temperature it is preferred to employ preheating means to promote extensive vaporization of the olefin prior to mixing with the aziridine or introduction into the reactor. Best results are obtained when the reactor is packed with an inert material, e.g., glass helices, to promote more even heat transfer. Customarily the excess of olefin, or alternatively an inert gas such as nitrogen, helium, methane, argon or the like, is employed as a transfer agent to facilitate passage of the gaseous reactants through the reactor. Subsequent to reaction, the effluent from the reactor is condensed and the product mixture separated by conventional means such as are described above.

The vapor-phase procedure is particularly suited to the reaction of readily vaporizable or normally gaseous olefins, e.g., ethylene, propylene and the butenes, although satisfactory results can be obtained when higher olefins are employed.

The products of the process of the invention are pyrrolidines, illustratively produced by cleavage of the aziridine ring and subsequent 1,3-cycloaddition of the diradical thereby produced to an ethylenic linkage of the olefin. When the process is conducted using ethylenimine and ethylene as reactants, the process is illustrated by the equation below.

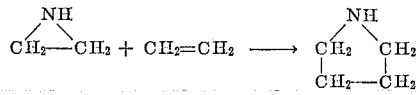

When the aziridine possesses substituents or when other olefins are employed, the pyrrolidine product contains corresponding substituents upon the heterocyclic five-membered ring. From the reaction of 1-methylaziridine and propylene, for example, is obtained 1,2-dimethylpyrrolidine. Other illustrative products include 1-ethylpyrrolidine, 1-butylpyrrolidine, 2-propylpyrrolidine, 2-propyl-3-methylpyrrolidine, 1,2,5-trimethylpyrrolidine, 2-hexylpyrrolidine, 1-methyl-2,3-dibutylpyrrolidine, 2-dodecylpyrrolidine, 1,4-dimethyl-2-decylpyrrolidine, 1,2-bis(2-pyrrolidyl)ethane, octahydroindole, 2-tetradecylpyrrolidine, 1-octadecylpyrrolidine, 1-phenylpyrrolidine, 2-decyl-3-hexylpyrrolidine, 1,3-dimethyl-2-dodecylpyrrolidine, 2-tridecylpyrrolidine and the like.

A particularly preferred class of pyrrolidine products are those pyrrolidines produced by reaction of N-methylethylenimine and straight-chain acyclic mono-olefins having from 10 to 20 carbon atoms. Such products are 1-methyl-2,3-(mono- to di-alkyl)pyrrolidines wherein the total of carbon atoms in the said alkyl substituents is from 8 to 18. When the preferred terminal olefins are employed, the alkyl substituent is customarily located in the 2-position, and 1-methyl-2-alkylpyrrolidines, wherein said alkyl substituent has from 8 to 18 carbon atoms, particularly 10 to 16, are the observed product, which type of products are preferred. Such alkyl-substituted 1-methylpyrrolidines are readily converted into novel N-oxides which are surface active agents of great activity. These amine oxides are described and claimed in copending application U.S. Serial No. 330,577 filed of even date by applicant jointly with G. A. Gillies.

The pyrrolidine products of the invention find further utility as solvents and also as intermediates in the production of agricultural chemicals, particularly insecticides, and pharmaceutical chemicals. They are also suitably employed as epoxy curing agents of the active hydrogen type when the nitrogen possesses a hydrogen substituent or of the catalytic type when the nitrogen is tertiary. The pyrrolidines are reacted with inorganic acids to form useful pyrrolidinium salts, and in the case of N-hydropyrrolidines, are reacted with acids to form useful amides.

To further illustrate the novel process of the invention, the following examples are provided. It should be understood that they are not to be regarded as limitations, as the teachings thereof may be varied as will be understood by one skilled in this art.

EXAMPLE I

To a 250 ml. autoclave was charged 100 cc. (67 g.) of 1-hexene and 0.1 g. NaOH and the temperature was raised to 325° C. Over a 30 minute period of time, 10 cc. (8.3 g.) of ethylenimine was added and the reaction mixture was stirred while maintained at 325° C. for an additional hour. The autoclave was cooled and the contents removed and filtered. Unreacted starting material was removed by distillation and the residue was vacuum flash-distilled to separate product from about 3 g. of polymer. The distillate was then redistilled to obtain 12 g. of 2-butylpyrrolidine, B.P. 60° C. at 10 mm., which represented a 63% yield based upon a 50% conversion of ethylenimine. The nuclear magnetic resonance spectrum of the product was consistent with the above structure.

|  | Anal Calc. | Found |
|---|---|---|
| C, percent wt | 75.60 | 75.1 |
| H, percent wt | 13.38 | 13.1 |
| N, percent wt | 11.02 | 11.4 |

EXAMPLE II

By the procedure of Example I, ethylenimine was reacted with 1-decene. The product, 2-octylpyrrolidine, B.P. 93° C. at 0.5 mm., was obtained in 47% yield based upon a conversion of 36%.

|  | Anal. Calc. | Found |
|---|---|---|
| C, percent wt | 78.6 | 78.3 |
| H, percent wt | 13.7 | 13.8 |
| N, percent wt | 7.7 | 7.6 |

EXAMPLE III

The procedure of Example I was followed to react various aziridines with a variety of olefins. The results of these experiments are shown in Table I.

*Table I*

| Aziridine | Olefin | B. P. of product | Yield | Conversion |
|---|---|---|---|---|
| Ethylenimine | 2-hexene | 82° C. at 30 mm | 23 | 15 |
|  | 1-octene | 68° C. at 2 mm | 42 | 32 |
| N-methylethylenimine. | 1-hexene | 78° C. at 18 mm | 70 | 68 |
|  | 2-hexene | 71° C. at 20 mm | 31 | 25 |
|  | 1-octene | 93° C. at 10 mm | 63 | 60 |
|  | 1-decene | 85° C. at 0.5 mm | 66 | 66 |
|  | 1-dodecene | 97° C. at 0.3 mm | 70 | 67 |
|  | 1-tetradecene. | 112° C. at 0.1 mm | 75 | 75 |
|  | 1-hexadecene. | 156° C. at 0.05 mm | 73 | 73 |
| Propylenimine | 1-hexene | 44° C. at 2 mm | 52 | 47 |

EXAMPLE IV

A tubular glass reactor, 2 feet in length and having an internal diameter of 0.75 inch, which had been filled with glass helices was employed to react ethylene and N-methylethylenimine. Ethylene was continuously introduced to the reactor maintained at 375° C. N-methylethylenimine was then introduced in a weight ratio of 1:10 to the ethylene. The excess olefin was employed as a transfer agent and was vented after passing through a cold trap which served to condense the product and unreacted N-methylethylenimine. After the addition of 20 ml. (15 g.) of N-methylethylenimine over a 6 hour period, the reaction was halted and the product mixture was distilled. A 14 g. yield of N-methylpyrrolidine, B.P. 81° C. was obtained which represented a 74% yield based upon a 57% conversion of the imine. Analysis by infrared and mass spectrographic methods confirmed the above structure.

EXAMPLE V

When the procedure of Example IV was followed to react ethylene with ethylenimine, a 58% yield of product, pyrrolidine, B.P. 88° C., was obtained based upon a 43% conversion.

I claim as my invention:
1. The process for the production of a pyrrolidine product comprising reacting the aziridine having 2 to 60 carbon atoms of the formula

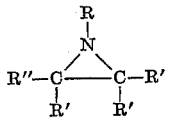

wherein R, R' and R" independently are selected from hydrogen, alkyl of up to 20 carbon atoms, aralkyl of up to 20 carbon atoms or mononuclear aryl of 6 to 10 carbon atoms, with a hydrocarbon olefinic compound of from 2 to 30 carbon atoms selected from alkene or non-conjugated alkadiene, the molar ratio of said olefinic compound to said aziridine being from about 2:1 to about 100:1, in a non-acidic reaction environment at a temperature from about 250° C. to about 450° C.

2. The process for the production of a pyrrolidine product comprising reacting 1,2-(non- to dialkyl)aziridine wherein each alkyl has from 1 to 20 carbon atoms with an alkene of from 2 to 30 carbon atoms, the molar ratio of said alkene to said aziridine being from about 2:1 to about 100:1, in a non-acidic reaction environment at a temperature from about 250° C. to about 450° C.

3. The process of claim 2 wherein the alkene is a 1-alkene.

4. The process for the production of a pyrrolidine product comprising reacting 1,2-(non- to dimethyl)aziridine with a straight-chain alkene of from 2 to 20 carbon atoms, the molar ratio of said alkene to said aziridine being from about 2:1 to about 100:1, in a non-acidic reaction environment at a temperature from about 300° C. to about 400° C.

5. The process for the production of a 1-methylpyrrolidine product comprising reacting N-methylethylenimine with a straight-chain alkene of from 10 to 20 carbon atoms, the molar ratio of said alkene to N-methylethylenimine being from about 2:1 to about 100:1, in a non-acidic reaction environment at a temperature from 300° C. to 400° C.

6. The process of claim 5 wherein the alkene is a 1-alkene.

7. The process of claim 5 wherein the alkene is 1-dodecene.

8. The process of claim 5 wherein the alkene is 1-tetradecene.

9. The process of claim 5 wherein the alkene is 1-hexadecene.

10. The process for the production of a pyrrolidine product comprising reacting ethylenimine with a straight-chain alkene of from 2 to 20 carbon atoms, the molar ratio of said alkene to ethylenimine being from about 2:1 to about 100:1, in a non-acidic reaction environment at a temperature from about 300° C. to about 400° C.

11. The process of claim 10 wherein the alkene is ethylene.

12. The process of claim 10 wherein the olefin is 1-decene.

References Cited by the Examiner

UNITED STATES PATENTS

| 2,169,976 | 8/1939 | Guenther et al. | 260—561 |
| 2,654,737 | 10/1953 | Bestian | 260—239 |
| 3,047,579 | 7/1962 | Witman | 260—289 |

OTHER REFERENCES

Ames et al., Jour. Chem. Soc., 1952, pages 1057–1068.

Barry et al., Chem. Abstracts, vol. 48, 1954, par. 1376i to 1377g.

Richter, The Chemistry of the Carbon Compounds, vol. IV, 1947, Elsevier Publishing Co., Inc., New York, New York, pages 4–5.

Sidgwick, The Organic Chemistry of Nitrogen, Oxford University Press, Oxford, 1937, page 468.

NICHOLAS S. RIZZO, *Primary Examiner.*

MARY U. O'BRIEN, *Assistant Examiner.*